R. A. SMITH.
Garbage Cart.

No. 48,847.

Patented July 18, 1865.

Witnesses
W. R. Delany
E. Litle

Inventor.
H. Howson
per C. L. Foster
Atty for R. A. Smith

UNITED STATES PATENT OFFICE.

R. A. SMITH, OF PHILADELPHIA, PENNSYLVANIA.

IMPROVEMENT IN VESSELS FOR RECEPTION AND TRANSPORTATION OF NIGHT-SOIL.

Specification forming part of Letters Patent No. 48,847, dated July 18, 1865; antedated July 6, 1865.

*To all whom it may concern:*

Be it known that I, R. A. SMITH, of Philadelphia, Pennsylvania, have invented an Improved Vessel for the Reception of Night-Soil and Garbage; and I do hereby declare the following to be a full, clear, and exact description of the same, reference being had to the accompanying drawings, and to the letters of reference marked thereon.

My invention, which is fully described hereinafter, has been designed with the view of collecting garbage and night-soil and facilitating the transportation of the same from towns and cities to localities where it is most valuable as manure.

Figure 1:
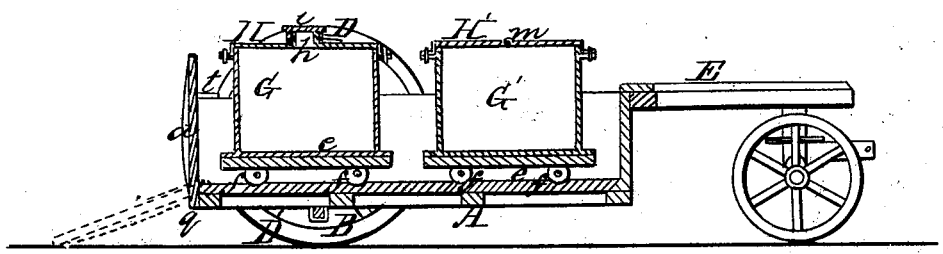
Figure 2:
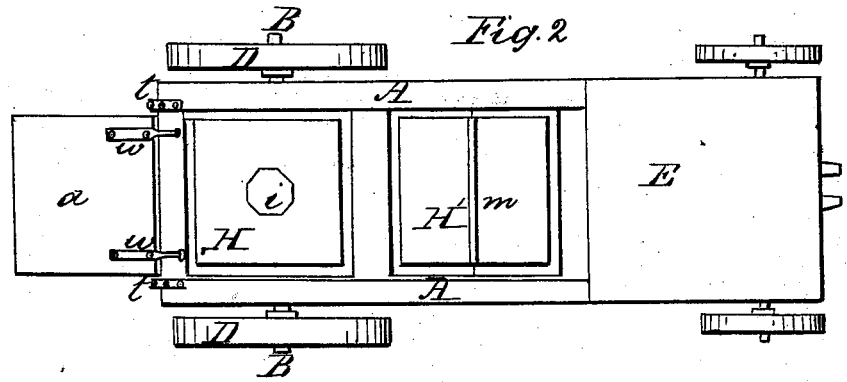

On reference to the accompanying drawings, which form a part of this specification, Figure 1 is a longitudinal section of a cart containing the night-soil and garbage vessels; Fig. 2, a plan view.

A represents the body of the cart, the form of which is that of an oblong box open at the top and closed at the rear by the detachable board $a$. A bent axle, B, passes beneath the body of the cart and extends upward on both sides of the same, and to this axle are hung the wheels D, which support the rear of the body.

In front of the body, and on a level, or thereabout, with the upper edge of the same, is a platform, E, on which the driver may stand, or to which the driver's seat may be secured, this platform resting on the front axle, which is furnished with the usual pole, and which is arranged to turn on a king-bolt, as in ordinary wagons.

G and G' are two metal boxes for the reception of the garbage or night-soil, each box being secured to or forming a part of a platform, $e$, to pins or axles on the under side of which are hung small wheels or rollers $f$. On the upper edge of each box, and extending along each side of the same, is a flange adapted to a similar flange on the cover H, which is secured to the box by suitable set-screws.

In the center of the cover H of the box G is a tubular projection, $h$, furnished with a detachable cap, $i$; and the cover H' of the box G' is made in two pieces hinged together at $m$, so that one-half can be turned back, thereby exposing the interior of the box.

It should be understood that the platforms $e$, one of which forms the base of each box, are of such a width and are so adapted to the body of the cart that they cannot move to and fro laterally in the same, except to the limited extent necessary to permit them to be moved freely longitudinally. The board $a$ is arranged to rest on plates $q$ secured to the under side of the body of the cart, the plates being turned up at the ends, so as to prevent the board from moving outward. A plate, $t$, is also secured to each side at the rear of the body of the cart, each plate passing through an opening in the board, which is secured by a pin passing through an opening in the plate. On withdrawing these pins the board can be detached from the body of the cart and be so adjusted to the same as to serve as an inclined plane, down which the boxes can pass from the body of the cart. When thus used hooks $w$, projecting from one edge of the board, fit into holes made in the bottom of the cart at the rear end of the same, as seen in Fig. 2.

The night-soil and garbage are deposited in the boxes, to which, when full, the covers are so secured as to form perfectly-tight joints. The nuisance caused by conveying these offensive substances in open carts through towns and cities is consequently avoided. The boxes are conveyed in the cart to the point where they are to be emptied, or to railroad-stations or wharves, where the loaded boxes may be transferred to cars or vessels for transportation to distant points, where their contents are available as manure, the cart returning with empty boxes.

In localities where offensive garbage is usually collected—near dwellings, in open barrels, boxes, and other exposed receptacles placed on the sidewalk or in yards—I propose to leave one of the boxes, G', with the hinged lid, which, when closed, prevents the emanation from the contents of noxious exhalations, the box, when full, being removed in the cart and replaced with an empty one. I also propose to use the box G in connection with a water-closet, the soil-pipe of which I connect to the tubular projection $h$ of the cover. When full the box is replaced with an empty one and the first transferred to the cart, the cap $i$ having been first attached to the projection $h$.

It will be evident without further description that my improved night-soil and garbage vessel serves the purposes of inducing cleanliness in crowded localities, obviating the nuisance caused by the usual mode of removing garbage, and of facilitating the transportation of night-soil, which is generally permitted to escape into sewers and drains, but which, by the aid of my invention, can be saved and transported to distant localities, where it becomes valuable as a manure.

I claim as my invention and desire to secure by Letters Patent—

The box G, rollers $f$, tight-fitting detachable cover H, having the tubular projection $h$, and its cap $i$, the whole being constructed and adapted for the reception and transportation of night-soil and garbage, as set forth.

In testimony whereof I have signed my name to this specification in the presence of two subscribing witnesses.

R. A. SMITH.

Witnesses:
C. E. FOSTER,
JOHN WHITE.